Figure 1:
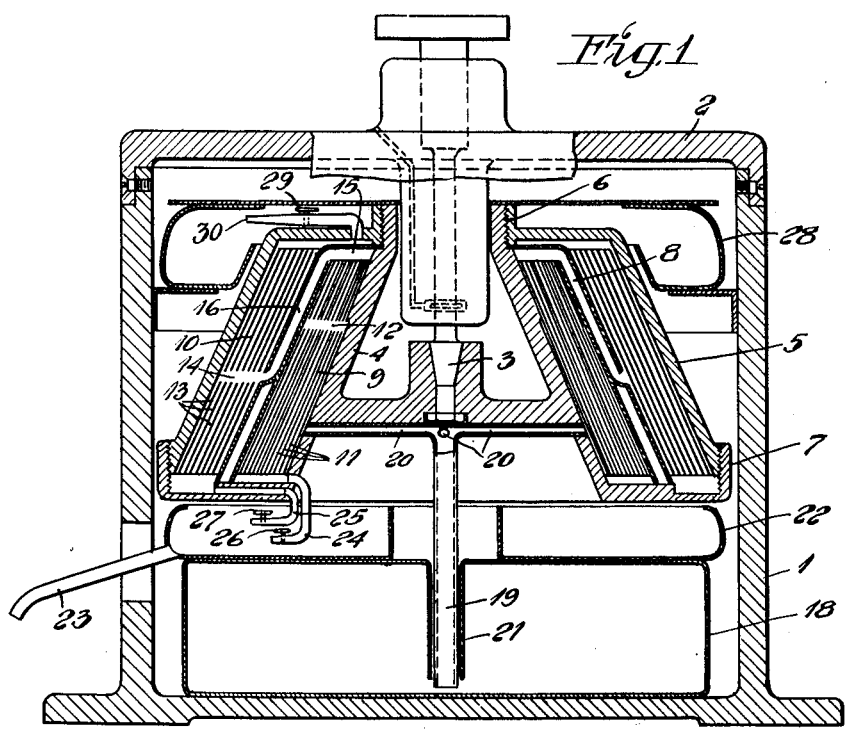

Nov. 26, 1929.   K. T. R. LUNDGREN   1,736,792
CENTRIFUGAL CONCENTRATOR
Filed April 11, 1928

INVENTOR
KARL TORSTEN RAGNAR LUNDGREN
By George L. Sachs
ATTORNEY

Patented Nov. 26, 1929

1,736,792

UNITED STATES PATENT OFFICE

KARL TORSTEN RAGNAR LUNDGREN, OF LUND, SWEDEN

CENTRIFUGAL CONCENTRATOR

Application filed April 11, 1928, Serial No. 269,106, and in Sweden January 27, 1928.

The present invention refers to a concentrator built on the separator principle and adapted specially for the production of butter directly out of fresh or acidified milk.

According to the invention, the concentrator consists, the same as ordinary cream separators, of a number of rotatable sheet metal cones combined in such a manner as to leave running spaces between them of a depth of 1½–2 millimeters, but disposed as nearly as possible in parallel to the axis of rotation, at so great an angle to the said axis, however, that proper separation of the cream and the milk is not jeopardized, in addition to which the said concentrator is provided with throttling means such as renewable nozzles for the milk inlets and for the outlets for skim-milk and butter respectively, said nozzles being of different width or of different length, and the concentrator being so arranged that the cream produced will be influenced by the centrifugal force during a certain minimum of time by a sufficiently slow wandering toward the outlet, so that the cream will be converted into butter, whereas the separated skim-milk is permitted to run off through the outlet as soon as the milk fat has been separated.

Moreover, the apparatus may preferably be provided with valve means in the milk inlet and in the butter and skim-milk outlets respectively, by means of which the milk is supplied intermittently and the advance of the butter in the running spaces and the tapping of the skim-milk therefrom take place periodically, so that the separation of the cream and the production of butter take place while the milk is standing still in the running spaces. The said valves may then be automatically dependent on the axis of rotation of the apparatus by means of suitable gearings, in such a manner that the same are kept open during a certain number of revolutions and closed during a given number of revolutions.

The apparatus may also be provided with two separating chambers, that is to say, a cream-producing chamber built as an ordinary separator with running spaces having a depth of about 1 millimeter, and a butter-producing chamber communicating with the cream-producing chamber, the butter-producing chamber being, likewise, constructed on the separator principle, but with a distance between the sheet metal cones of at least 1½, preferably 2 millimeters, the running spaces of both chambers, however, being disposed as nearly as possible in parallel to the axis of rotation with respect to an effective separation of the skim-milk from the cream or of the butter-milk from the butter. A controllable outlet should then also be provided for the butter milk.

An embodiment of an apparatus according to the invention is illustrated in the accompanying drawing. Fig. 1 is an axial section of the apparatus, and Fig. 2 a top plan view of one of the sheet metal cones.

In Fig. 1, 1 designates the frame of the apparatus and 2 a removable shield forming the bearing for the vertically disposed shaft 3 of the apparatus, at which the inset of the apparatus is suspended. This inset consists of an inner conical portion 4 and an outer conical mantle 5 which is connected by means of screws, as at 6 and 7, with the inner part 4. The space between the part 4 and the mantle 5 is divided by means of a conical partition 8 into two chambers 9 and 10, of which the inner chamber 9 forms the cream-producing chamber, whereas the outer chamber 10 forms the butter-producing chamber as will be described more fully hereinbelow.

As in ordinary cream separators, there is provided a number of sheet metal cones 11 in the inner chamber 9, the said sheet metal cones having intervening running spaces of about 1 millimeter, the various running spaces communicating with each other in known manner through openings 12 provided in the cones.

Likewise, a number of sheet metal cones 13 are arranged in the outer chamber 10, the running spaces of these latter cones having a width, however, of about 1½–2 millimeters. The communication between these running spaces is also brought about by openings 14 provided in the sheet metal cones (Figs. 1 and 2).

The communication between the two chambers 9 and 10 is brought about through the annular space 15 provided at the upper end of the cream-producing chamber 9 and through the space 16 on the outside of the partition 8, which space 16 is also annular and disposed at an angle to the space 15, the space 16 communicating with the openings 14 in the sheet metal cones of the butter-producing chamber 10.

Figure 2:
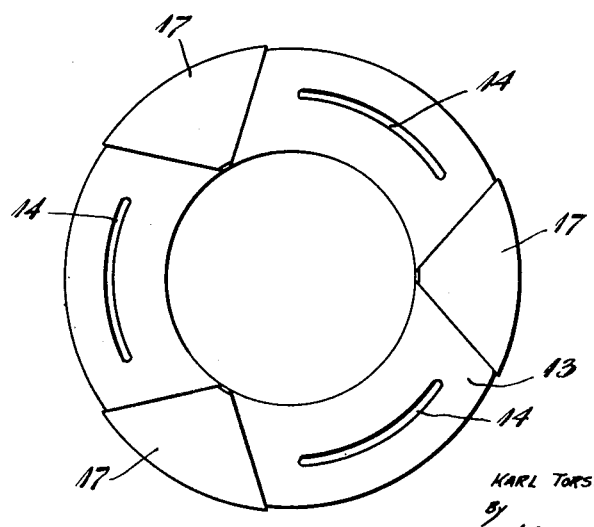

The sheet metal cones 13 of the butter-producing chamber 10 are kept at the desired mutual distance by means of triangular or wedge-shaped intermediate members 17, Fig. 2, so that the channels formed by these intermediate members and by two adjacent sheet metal cones will have a substantially constant section of passage along the whole length from the base of the cone to the apex thereof. The channels of each series have no communication with each other, but communicate with the channels of the adjacent series (one or more) through the openings 14 in the sheet metal cones. Thus each channel is given the shape of a flat pipe disposed at an angle to the axis of rotation 3, whereby the efficiency of the apparatus is materially increased.

If desired, the inset of sheet metal cones in the cream-producing chamber may also be advantageously formed in the same manner.

Here, the sheet metal cones are made with an angle of inclination of 30 degrees to the axis of rotation.

The container 18 for the new milk is provided, according to the invention, under the rotating inset, and at the rotation the milk is sucked up into the cream-producing chamber 9 through a centrally disposed pipe 19 and through pipes 20 arranged crosswise on the lower side of the inset part 4. The central pipe 19 extends about to the bottom of the milk container 18 and is surrounded by a central sleeve 21 provided therein to prevent the formation of foam at the rotation of pipe 19.

Arranged above the milk container 18 is a collecting receptacle 22 for the skim-milk and the butter-milk, which receptacle is also stationary, the butter-milk being tapped through an outlet 23. The skim-milk and the butter-milk enter the said receptacle 22 through pipes 24 and 25 respectively rotating with the inset, of which pipes the former one 24 communicates with the lower end of the cream-producing chamber 9, whereas the latter pipe 25 communicates with the lower end of the butter-producing chamber 10. Both these pipes are provided with controllable outlet valves 26 and 27 respectively. Such a control valve may also be provided in the inlet pipe 19 for the new milk.

Provided at the upper end of the inset is a stationary container 28 for the butter which passes from the butter-producing chamber 10 through the outlet pipe 30 provided with the valve 29.

When separation is carried out, milk is being sucked in by reason of the centrifugal force, from the container 18 into the central pipe 19 and the cross-wise pipes 20, and enters the cream-producing chamber 9 which will be entirely filled by the milk through the openings 12 in the sheet metal cones. The separated cream rises and passes through the spaces 15 and 16 to the butter-producing chamber 10, whereas the separated milk wanders downwards and escapes through pipe 24 into the receptacle 22.

The cream entering the chamber 10 is converted into butter immediately above the openings 14, which butter wanders very slowly in an upward direction toward the outlet pipe 30 while the water content of the butter is continuously diminishing. The butter produced is hurled out into the container 28. The butter-milk wanders downwards and flows off through pipe 25 into the receptacle 22 where it is mixed with the skim-milk and escapes together with the latter through the outlet 23. Obviously, the skim-milk and the butter-milk may be conducted, if desired, into separate receptacles with separate outlets. To this end, the receptacle 22, for instance, need only be divided by means of an annular partition into two separate chambers which are provided with separate outlets.

The reason for the fact that only cream is formed in the chamber 9, no butter being produced in this chamber, is the great velocity of flow of the milk prevailing in this chamber. Large quantities of milk wander through the cream-producing chamber, but the major portion of this milk flows off immediately as separated milk. A small portion enters the butter-producing chamber 10 in the form of cream. For this reason already the admission velocity in this chamber is much smaller than the admission velocity in the cream-producing chamber. This slow streaming is rendered still slower for the reason that the room in the running spaces of the chamber 10, which are of a width of about 2 millimeters, is larger than in the cream-producing chamber.

As has been found by trials carried out in practice, the rate of movement of the butter should not exceed ½ centimeter per minute if the churn is constructed for a speed of rotation of 6000 revolutions per minute. Furthermore, the path travelled by the butter, after it has been formed, should not be shorter than 6–8 centimeters.

The water contents of the butter may be reduced by increasing the length of the said path or by diminishing its rate of movement, and also by increasing the speed of rotation of the churn. The rate of movement may be varied by controlling the outlet for the butter and the outlets for the skim-milk and the butter-milk, as well as the outlet for the fresh milk. Such control may be effected either by means of valves, as shown, or by exchangeable nozzles of different lengths or different widths.

The churn may also be constructed for an intermittent milk supply or an intermittent discharge of butter and butter-milk. The production of butter will then take place while the column of milk is standing still in relation to the churn. After the butter has formed, another quantity of milk is introduced, the butter already formed is driven upwardly, and the separated milk is forced out. The fresh supply of milk is subjected to centrifugation until butter has formed, another quantity of milk is supplied, the separated milk is discharged, and so forth, until the whole quantity of milk has been treated. By this means the advantage is obtained that no special cream-producing chamber is required. The control of the intermittent supply of milk or of the discharge of butter and butter-milk may then, as stated, be effected by means of valves which are actuated by means of suitable motion-transmitting mechanisms from the shaft of the apparatus, in such a manner that the valves are kept open during a certain number of revolutions and closed during a certain number of revolutions.

The apparatus may be driven either by means of a directly coupled motor or by suitable gearings.

What I claim is:—

1. A concentrator for the production of butter from milk characterized by a revolving inner part comprising an inner chamber and an outer chamber inclined toward the axis of rotation, supply pipes for supplying milk to said inner chamber, outlet means in the lower part of said inner chamber, a second outlet means in the lower part of said outer chamber and communicating means between the upper part of said inner chamber and the central part of said outer chamber.

2. A concentrator for the production of butter from milk characterized by a revolving inner part comprising an inner chamber and an outer chamber inclined toward the axis of rotation, supply pipes for supplying milk to said inner chamber, outlet means in the bottom of said inner chamber, a second outlet means in the bottom of said outer chamber, communicating means between the upper part of said inner and the central part of said outer chamber and a plurality of sheet metal truncated cones positioned in spaced relation within said inner and outer chambers.

3. A concentrator for the production of butter from milk characterized by a revolving inner part comprising an inner chamber and an outer chamber inclined toward the axis of rotation, supply pipes for supplying milk to said inner chamber, outlet means in the bottom of said inner chamber, a second outlet means in the bottom of said outer chamber, communicating means between the upper part of said inner and the central part of said outer chamber, a plurality of sheet metal truncated cones positioned in spaced relation within said inner and outer chambers and a plurality of wedge-shaped intermediate members positioned between said sheet metal truncated cones to space the same and forming running spaces of constant cross-section and in a plane through said axis of rotation.

4. A concentrator for the production of butter from milk characterized by a revolving inner part comprising an inner chamber and an outer chamber inclined toward the axis of rotation, supply pipes for supplying milk to said inner chamber, outlet means in the bottom of said inner chamber, a second outlet means in the bottom of said outer chamber, communicating means between the upper part of said inner and the central part of said outer chamber, a plurality of sheet metal truncated cones positioned in spaced relation within said inner and outer chambers, a plurality of wedge-shaped intermediate members positioned between said sheet metal truncated cones to space the same and a plurality of horizontal slots near the edge of said sheet metal truncated cones within said inner chamber forming openings between the running spaces within said chamber.

5. A concentrator for the production of butter from milk characterized by a revolving inner part comprising an inner chamber and an outer chamber inclined toward the axis of rotation, supply pipes for supplying milk to said inner chamber, outlet means in the bottom of said inner chamber, a second outlet means in the bottom of said outer chamber, communicating means between the upper part of said inner and the central part of said outer chamber, a plurality of sheet metal truncated cones positioned in spaced relation within said inner and outer chambers, a plurality of wedge-shaped intermediate members positioned between said sheet metal truncated cones to form running spaces, a plurality of horizontal slots near the upper edge of said sheet metal truncated cones within said inner chamber forming communication between said running spaces and a second plurality of horizontal slots centrally located in said sheet metal truncated cones within said outer chamber forming communication between the running spaces in said outer chamber and forming a continuation of said communicating means.

6. A concentrator for the production of butter from milk characterized by a revolving inner part comprising an inner chamber and an outer chamber inclined toward the axis of rotation, supply pipes for supply milk to said inner chamber, outlet means in the bottom of said inner chamber, a second outlet means in the bottom of said outer chamber, communicating means between the upper part of said inner chamber and the central part of said outer chamber and a plurality of sheet metal truncated cones positioned in spaced relation within said inner and outer chambers, and further characterized by a milk container in the base of said concentrator and a sleeve integral with said milk container adjacent the vertical pipe of said supply pipe.

7. A concentrator for the production of butter from milk characterized by a revolving inner part comprising an inner chamber and an outer chamber inclined toward the axis of rotation, supply pipes for supplying milk to said inner chamber, outlet means in the bottom of said inner chamber, a second outlet means in the bottom of said outer chamber, communicating means between the upper part of said inner and the central part of said outer chamber and a plurality of sheet metal truncated cones positioned in spaced relation within said inner and outer chambers, and further characterized by a skim milk and buttermilk receptacle in receptive relation to said first and second outlet means.

8. A concentrator for the production of butter from milk characterized by a revolving inner part comprising an inner chamber and an outer chamber inclined toward the axis of rotation, supply pipes for supplying milk to said inner chamber, outlet means in the bottom of said inner chamber, a second outlet means in the bottom of said outer chamber, communicating means between the upper part of said inner and the central part of said outer chamber, a plurality of sheet metal truncated cones positioned in spaced relation within said inner and outer chambers, a plurality of wedge-shaped intermediate members positioned between said sheet metal truncated cones to form running spaces, a plurality of horizontal slots near the upper edge of said sheet metal truncated cones within said inner chamber forming communication between said running spaces, a second plurality of horizontal slots centrally located in said sheet metal truncated cones within said outer chamber forming openings between the running spaces in said outer chamber and forming a continuation of said communicating means and a third outlet means in the upper part of said outer chamber, and further characterized by a butter container in receptive relation to said third outlet means.

9. A concentrator for the production of butter from milk characterized by a revolving inner part comprising an inner chamber and an outer chamber inclined toward the axis of rotation, supply pipes for supplying milk to said inner chamber, outlet means in the bottom of said inner chamber, a second outlet means in the bottom of said outer chamber, communicating means between the upper part of said inner and the central part of said outer chamber, a plurality of sheet metal truncated cones positioned in spaced relation within said inner and outer chambers, a plurality of wedge-shaped intermediate members positioned between said sheet metal truncated cones to form running spaces, a plurality of horizontal slots near the upper edge of said sheet metal truncated cones within said inner chamber forming communication between said running spaces, a second plurality of horizontal slots centrally located in said sheet metal truncated cones within said outer chamber forming openings between the running spaces in said outer chamber and forming a continuation of said communicating means and a third outlet means in the upper part of said outer chamber, and further characterized by a butter container in receptive relation to said third outlet means, a milk container in the base of said concentrator, a sleeve integral with said milk container adjacent the vertical pipe of said supply pipes and a skim milk and butter milk receptacle in receptive relation to said first and second outlet means.

In testimony whereof I affix my signature.

KARL TORSTEN RAGNAR LUNDGREN.